April 4, 1950   J. F. LIVINGSTON   2,502,659
CONVEYER CHAIN LUBRICATION
Filed Jan. 31, 1947   2 Sheets-Sheet 1
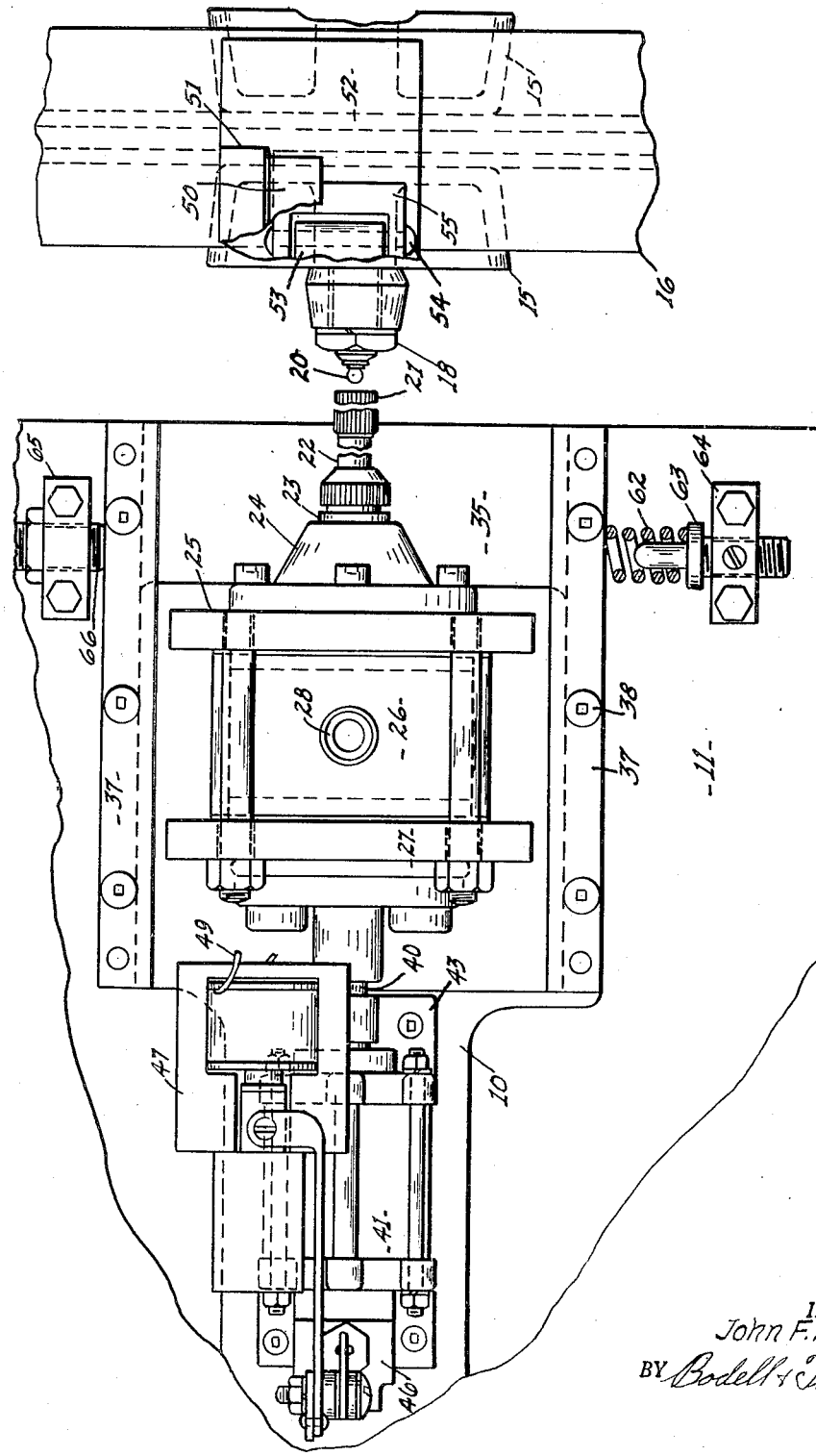
INVENTOR.
John F. Livingston
BY Bodell & Thompson
Attys.

April 4, 1950 J. F. LIVINGSTON 2,502,659
CONVEYER CHAIN LUBRICATION
Filed Jan. 31, 1947 2 Sheets-Sheet 2
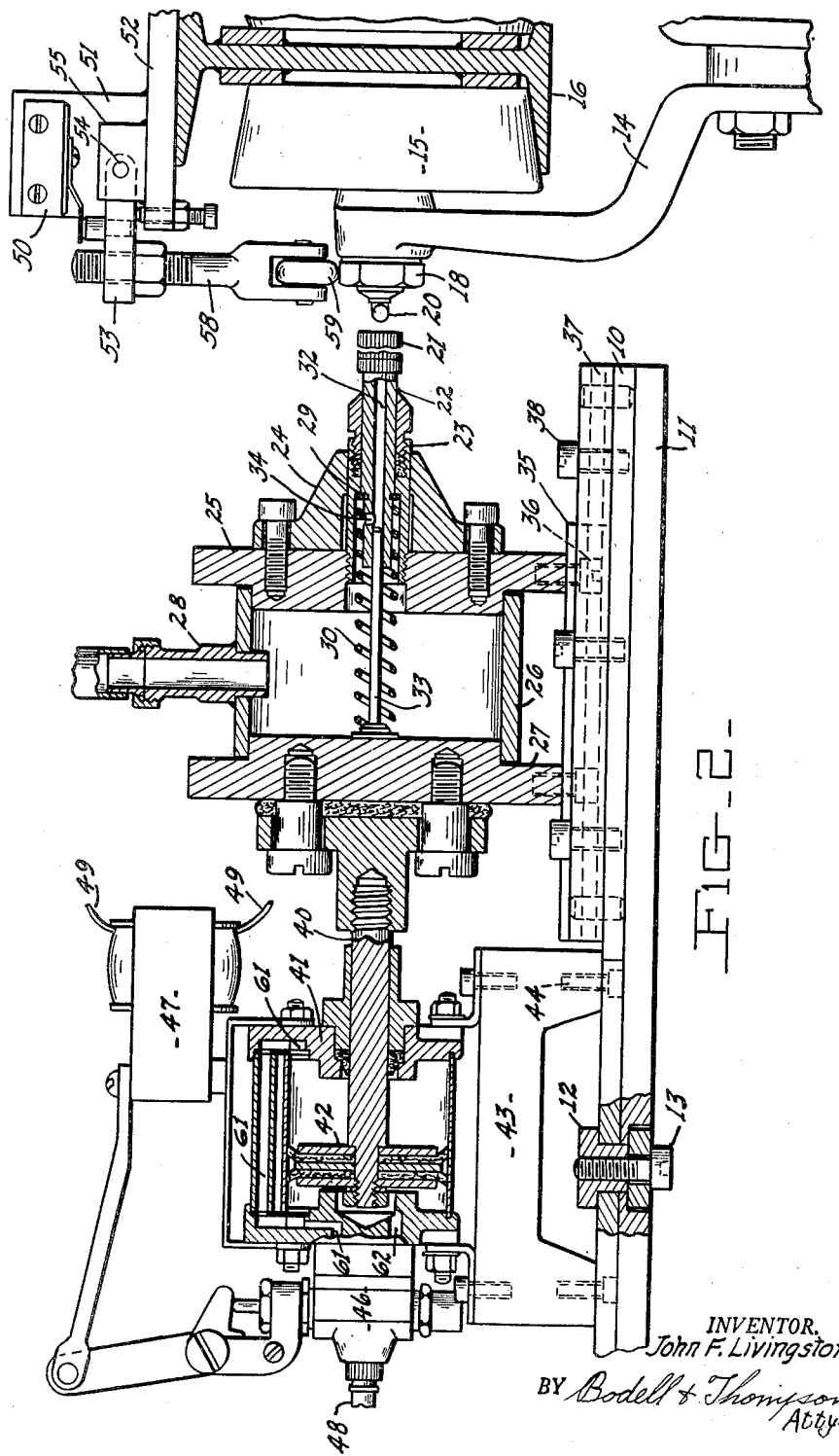
FIG-2-
INVENTOR.
John F. Livingston
BY Bodell & Thompson
Attys.

Patented Apr. 4, 1950

2,502,659

UNITED STATES PATENT OFFICE 2,502,659

CONVEYER CHAIN LUBRICATION

John F. Livingston, Syracuse, N. Y., assignor to Crouse-Hinds Company, Syracuse, N. Y., a corporation of New York Application January 31, 1947, Serial No. 725,587

2 Claims. (Cl. 184—15)

This invention relates to a mechanism for automatically applying lubricant to lubricant receiving fittings on conveyor chains while the chain is in motion.

Heretofore, devices of this nature included a lubricant applying nozzle positioned to be engaged by the lubricant receiving fittings as they advanced with the chain, and the advancement of the chain effecting movement of the fitting and associated mechanism to effect application of the lubricant. Such devices have been found to be unsatisfactory and often fail in operation, due to the uneven spacing of the fittings resulting from wear or stretch of the conveyor chain.

It is the object of this invention to provide an automatic lubricating mechanism which will effectively apply lubricant to each grease fitting on the chain regardless of the relative spacing, or arrangement, of the fittings.

This invention accordingly has for an object a device for automatically lubricating conveyor chains, and which embodies a structure having a lubricant applying nozzle which is moved into engagement with each fitting as the same approaches or reaches a predetermined position, and means operable to thereupon inject a quantity of lubricant into the fitting, the structure being particularly rugged and durable and operating over long periods of time without attention.

The invention consists in the novel features and in the combinations and constructions hereinafter set forth and claimed.

In describing this invention, reference is had to the accompanying drawings in which like characters designate corresponding parts in all the views.

Figure 1 is a top plan view of a lubricating device embodying my invention and showing a contiguous portion of the conveyor chain.

Figure 2 is a vertical sectional view of the lubricating mechanism shown in Figure 1.

The device consists of a base member in the form of a plate 10 pivoted, adjacent one end remote from the conveyor, on a support 11, the pivoted connection being in the form of a shouldered nut 12, and a screw 13.

The free end of the plate 10 is arranged adjacent the conveyor, which is here shown in the form of arms 14 depending from rollers 15 movable on the lower web of an I-beam 16. It will be understood, the rollers 15 are journalled upon a stud 18 extending through the arms, the outer end of the stud being provided with a lubricant receiving fitting 20.

The mechanism for injecting lubricant into the fittings 20 includes a nozzle 21 having a stem 22 slidably mounted in a barrel 23 mounted in a fixture or conical support 24, secured to an end plate 25 which, in conjunction with a cylindrical member 26 and an opposite end plate 27, forms a lubricant chamber connected to a supply of lubricant through a fitting 28.

The nozzle stem 22 is provided with a shoulder 29 against which one end of a compression spring 30 presses to yieldingly maintain the stem 22 in outward position. The opposite end of the spring engages the rear end plate 27 of the lubricant chamber. The stem is formed with an axially extending bore 32 in which a stem 33 extends, and which is carried by the rear end plate 27, see Figure 2, and the nozzle stem 22 is formed with a radial opening 34 communicating with the interior of the lubricant compartment. With this arrangement, lubricant from the lubricant compartment enters through the aperture 34 into the bore 32 of the nozzle stem, and as the stem is moved inwardly, the stationary stem 33 forces the lubricant at relatively high pressure through the passage 32 and into the fitting 20.

The lubricant chamber is mounted upon a plate 35, as by screws 36, and this plate is slidable axially toward and from the fittings 20 in ways 37 secured to the base plate 10, as by screws 38.

The lubricating mechanism is moved toward and from the fittings and the nozzle 21 into and out of engagement with the fittings by a piston rod 40 secured to the rear end wall 27 of the lubricant chamber and being slidably mounted in a cylinder 41 and provided at its inner end with a suitable piston 42. The cylinder 41 is mounted upon a supporting block 43 fixedly secured to the plate 10, as by screws 44. The piston is actuated by fluid, such as compressed air, which is supplied alternately to the ends of the cylinder by actuating mechanism operable when each fitting 20 arrives in axial registration with the nozzle 21. This means consists of a valve 46 actuated by a solenoid 47, the valve 46 being connected to a supply of fluid under pressure by conduit 48. The leads 49 from the coil of the solenoid 47 are connected through a switch 50 mounted upon the upper web of the I-beam 16 and which is closed as each fitting 20 arrives in register with the nozzle 21.

The switch 50 is mounted upon a bracket 51 secured to a plate 52 which, in turn, is secured to the top web of the I-beam. An arm 53 is pivoted at one end, as at 54, to a block 55 mounted upon the plate 52. A contact arm 58 is threaded into the arm 53 and depends downwardly having at its lower end a contact roller 59 arranged to engage a part of the conveyor chain, such as the head of the stud 18. Upon such engagement, the arm 53 is moved upwardly, closing the contacts of the switch 50 and energizing the solenoid 47 to effect operation of the valve 46, and admit fluid through the passage 60 to the rear end of the cylinder, causing the piston 42 and the rod 40 to move outwardly and to move the lubricant compartment, and gun nozzle 21 carried thereby, into engagement with the fitting 20 and effect application of the lubricant through the passage 32, as previously explained.

When the stud 18 moves out of engagement with the roller 59, the contacts of switch 50 are open permitting the valve 46 to return to normal position, whereupon fluid is admitted to the opposite end of the cylinder through the passage 61 effecting a positive return of the lubricating mechanism.

This operation is substantially instantaneous. However, in view of the fact that the conveyor chain is advancing, the plate 10 is moved slightly on its pivot 12 against a compression spring 62 interposed between the plate 10 and an adjustable stop screw 63 carried by a block 64 mounted upon the support 11. A similar block 65 is arranged on the support on the opposite side of the mechanism and is provided with an adjustable stop screw 66 to accurately initially position the mechanism with respect to actuation of the arm 58.

It will be apparent that the device described is positive in operation and that each fitting is adequately lubricated regardless of the spacing between the fittings. Accordingly, once the device is installed on a conveyor and properly adjusted, it will thereafter function efficiently for a long period of time without attention.

What I claim is:

1. Mechanism for lubricating conveyor chains and the like having lubricant receiving fittings spaced therealong comprising a support, a plate pivotally mounted on said support and extending toward the conveyor, a lubricating mechanism slidably mounted on said plate and having a nozzle extending outwardly and arranged in juxtaposition to the path of travel of said fittings, said mechanism being operable upon movement of said nozzle under pressure into engagement with said fittings to inject lubricant into the fittings, a cylinder fixedly mounted on said support, a piston arranged in the cylinder and being operatively connected to said lubricating mechanism, a supply of fluid under pressure, fluid control means arranged in juxtaposition to said conveyor and being operable as each fitting arrives in register with said nozzle to connect said cylinder to said fluid supply.

2. Mechanism for lubricating conveyor chains and the like having lubricant receiving fittings spaced therealong comprising a support, a plate pivotally mounted on said support and being detachably secured thereto by said pivot, a lubricating mechanism slidably mounted on the plate and having a nozzle extending outwardly, said mechanism being movable toward and from said conveyor to move said nozzle into and out of engagement with said fittings, said lubricating mechanism being operable upon movement of said nozzle under pressure into engagement with a fitting to inject lubricant into the fitting, a cylinder fixedly mounted on said plate and having a piston operatively connected to said mechanism, a supply of fluid under pressure and fluid control means operable to connect said supply to the cylinder as each fitting arrives in register with said nozzle.

JOHN F. LIVINGSTON.

REFERENCES CITED

The following references are of record in the file of this patent:

FOREIGN PATENTS

| Number | Country | Date |
| --- | --- | --- |
| 357,385 | Great Britain | Sept. 24, 1931 |
| 440,518 | Great Britain | Jan. 1, 1936 |